(12) United States Patent
Tajiri (10) Patent No.: US 12,151,606 B2
(45) Date of Patent: Nov. 26, 2024

(54) CANCEL CAM

(71) Applicants: FURUKAWA ELECTRIC CO., LTD., Tokyo (JP); FURUKAWA AUTOMOTIVE SYSTEMS INC., Inukami-gun (JP)

(72) Inventor: Yoji Tajiri, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 141 days.

(21) Appl. No.: 17/895,062

(22) Filed: Aug. 25, 2022

(65) Prior Publication Data
US 2022/0402425 A1    Dec. 22, 2022

Related U.S. Application Data

(63) Continuation of application No. PCT/JP2021/003921, filed on Feb. 3, 2021.

(30) Foreign Application Priority Data

Mar. 2, 2020    (JP) ................................ 2020-034833

(51) Int. Cl.
    *B60Q 1/42*         (2006.01)
(52) U.S. Cl.
    CPC ..................... *B60Q 1/42* (2013.01)
(58) Field of Classification Search
    CPC ....... B60Q 1/42; B60Q 1/425; B60Y 2306/09
    See application file for complete search history.

(56) References Cited

U.S. PATENT DOCUMENTS 10,289,149 B2 *   5/2019   Kosaka ................. B60Q 1/425
2013/0292234 A1    11/2013   Hiroki
(Continued)

FOREIGN PATENT DOCUMENTS

EP       2641781 A1     9/2013
EP       3232458 A1    10/2017
(Continued)

OTHER PUBLICATIONS

Extended European Search Report for corresponding EP Application No. 21764307.1-1012, Jun. 28, 2023.
(Continued)

*Primary Examiner* — Lheiren Mae A Caroc
(74) *Attorney, Agent, or Firm* — Mori & Ward, LLP (57) ABSTRACT

A cancel cam includes an annular member, a cam wall, and at least one reinforcing rib. The annular member is rotatable integrally with a steering shaft about a rotation axis and includes an outer peripheral portion, an inner peripheral portion, and a first surface. The cam wall extends from the outer peripheral portion in an axial direction and extends along the outer peripheral portion in a circumferential direction. The at least one reinforcing rib extends from the cam wall toward the inner peripheral portion and couples the cam wall to the annular member. The cam wall has a first axial length defined from the first surface in the axial direction. The inner peripheral portion has a second axial length defined from the first surface in the axial direction. The second axial length is shorter than the first axial length.

11 Claims, 11 Drawing Sheets

(56) References Cited

U.S. PATENT DOCUMENTS

| | | | |
|---|---|---|---|
| 2017/0293317 A1 | 10/2017 | Kosaka et al. | |
| 2020/0001805 A1 | 1/2020 | Hiroki | |
| 2024/0067109 A1* | 2/2024 | Zaruhata | ................. B62D 1/10 |

FOREIGN PATENT DOCUMENTS

| | | |
|---|---|---|
| JP | 63-159344 U | 10/1988 |
| JP | 03-94333 U | 9/1991 |
| JP | 2010-143460 | 7/2010 |
| JP | 5138022 B2 | 6/2012 |

OTHER PUBLICATIONS

Written Opinion for corresponding International Application No. PCT/JP2021/003921, Sep. 15, 2022.
International Search Report for corresponding International Application No. PCT/JP2021/003921, Apr. 6, 2021.

* cited by examiner

CANCEL CAM

CROSS-REFERENCE TO RELATED APPLICATIONS

The present application is a continuation application of International Application No. PCT/JP2021/003921, filed Feb. 3, 2021, which claims priority to Japanese Patent Application No. 2020-034833 filed Mar. 2, 2020. The contents of these applications are incorporated herein by reference in their entirety.

BACKGROUND

Technical Field

The technology disclosed in the present application relates to a cancel cam.

Background Art

Japanese Patent No. 5138022 and Japanese Unexamined Patent Publication No. 2010-143460 describe a cancel cam used in a rotary connector device.

SUMMARY

A cancel cam according to an aspect includes an annular member, a cam wall, and at least one reinforcing rib. The annular member is rotatable integrally with a steering shaft about a rotation axis and includes an outer peripheral portion, an inner peripheral portion, and a first surface which faces in an axial direction parallel to the rotation axis. The cam wall is configured to return the turn signal switch from an operating position to a neutral position. The cam wall extends from the outer peripheral portion in an axial direction and extends along the outer peripheral portion in a circumferential direction. The at least one reinforcing rib extends from the cam wall toward the inner peripheral portion and couples the cam wall to the annular member. The cam wall has a first axial length defined from the first surface in the axial direction. The inner peripheral portion has a second axial length defined from the first surface in the axial direction. The second axial length is shorter than the first axial length.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Hereinafter, embodiments will be described with reference to the drawings. In the drawings, the same reference signs denote corresponding or identical components.

Figure 1:
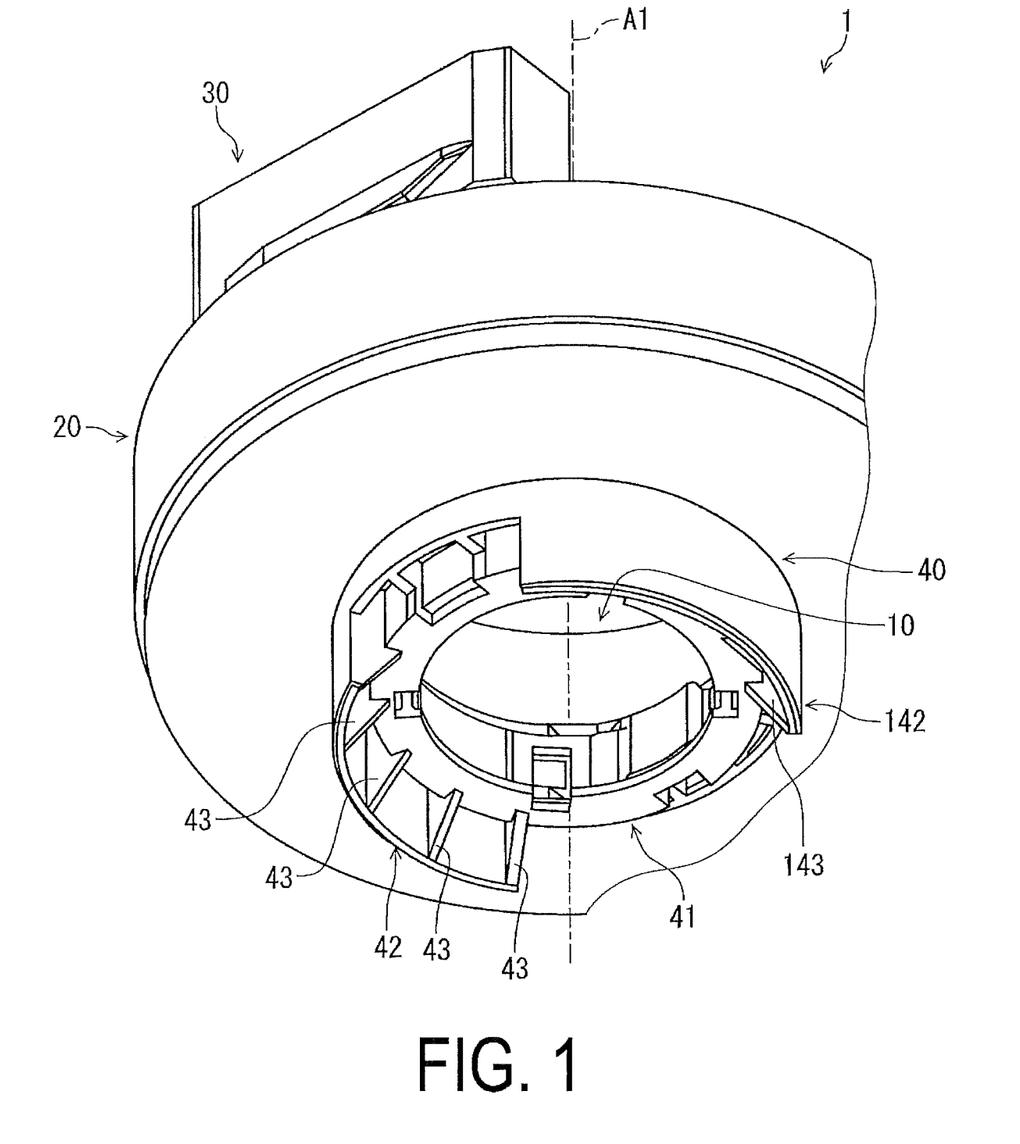
FIG. 1 is a perspective view of a rotary connector device including a cancel cam according to the present embodiment.

As illustrated in FIG. 1, a rotary connector device 1 includes a rotator 10, a stator 20, an electrical connector 30, and a cancel cam 40. The rotator 10 is provided so as to be rotatable around a rotation axis A1 with respect to the stator 20. In the present embodiment, for example, the stator 20 is configured to be fixed to a vehicle body, and the rotator 10 is configured to be coupled to a steering shaft S (see FIG. 5) of a steering wheel. The electrical connector 30 and the cancel cam 40 are attached to the rotator 10. The rotator 10, the electrical connector 30, and the cancel cam 40 are rotatable integrally with the steering wheel around the rotation axis A1. The electrical connector 30 is configured to be electrically connected to, for example, a steering side connector. The steering side connector is electrically connected to electric circuits such as switches of the steering wheel and an airbag device.

Figure 2:
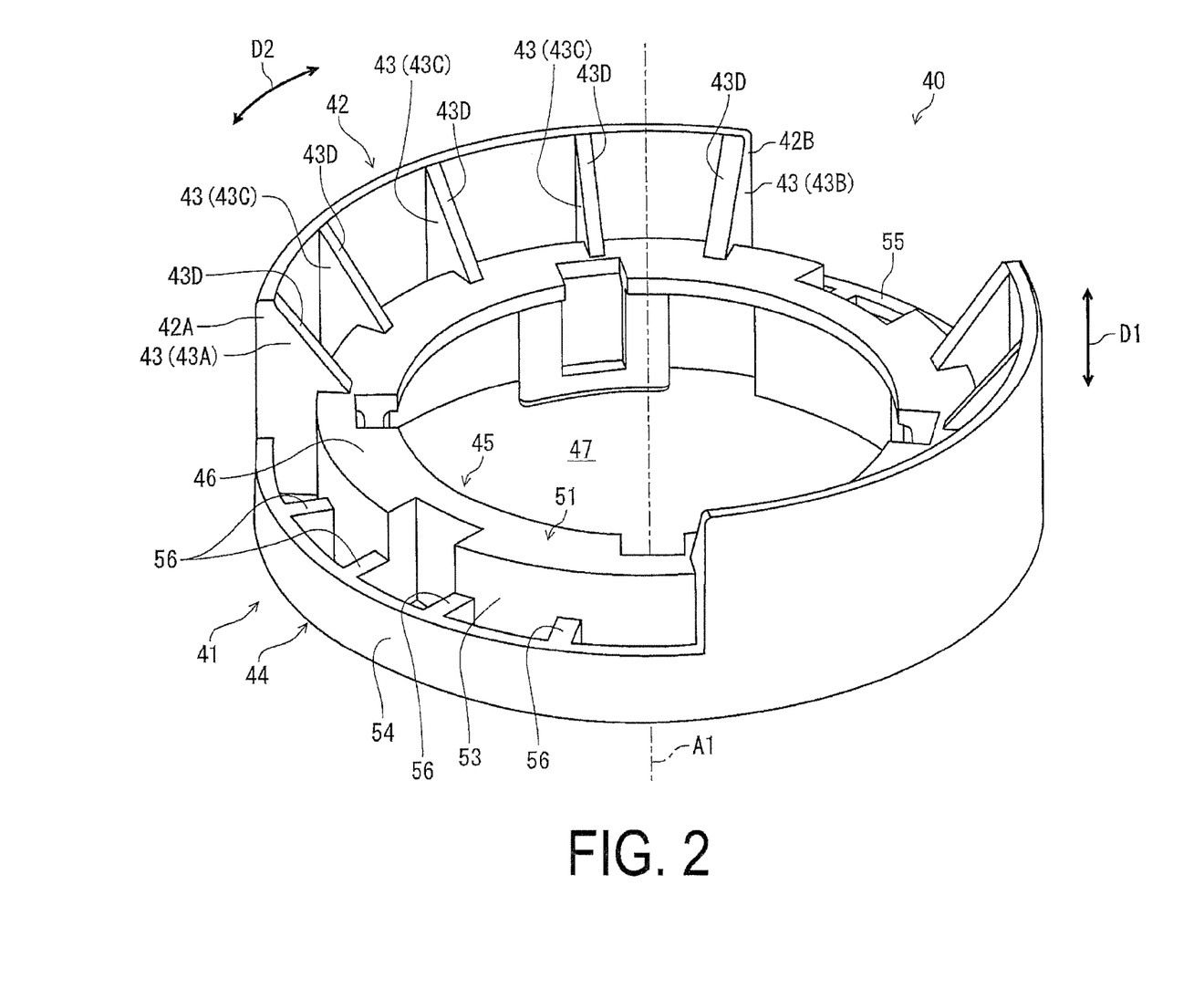
FIG. 2 is a perspective view of the cancel cam.

As illustrated in FIG. 2, the cancel cam 40 includes an annular member 41, a cam wall 42, and at least one reinforcing rib 43. The annular member 41 is rotatable integrally with the steering shaft around the rotation axis A1. The annular member 41 includes an outer peripheral portion 44, an inner peripheral portion 45, and a first surface 46. The first surface 46 faces in an axial direction D1 which is parallel to the rotation axis A1.

The outer peripheral portion 44 constitutes the outermost circumference of the annular member 41. The inner peripheral portion 45 constitutes the innermost circumference of the annular member 41. The annular member 41 includes an opening 47. The inner peripheral portion 45 defines at least a portion of the opening 47. When the rotary connector device 1 is mounted on a vehicle, the steering shaft is inserted into the opening 47.

Figure 10:
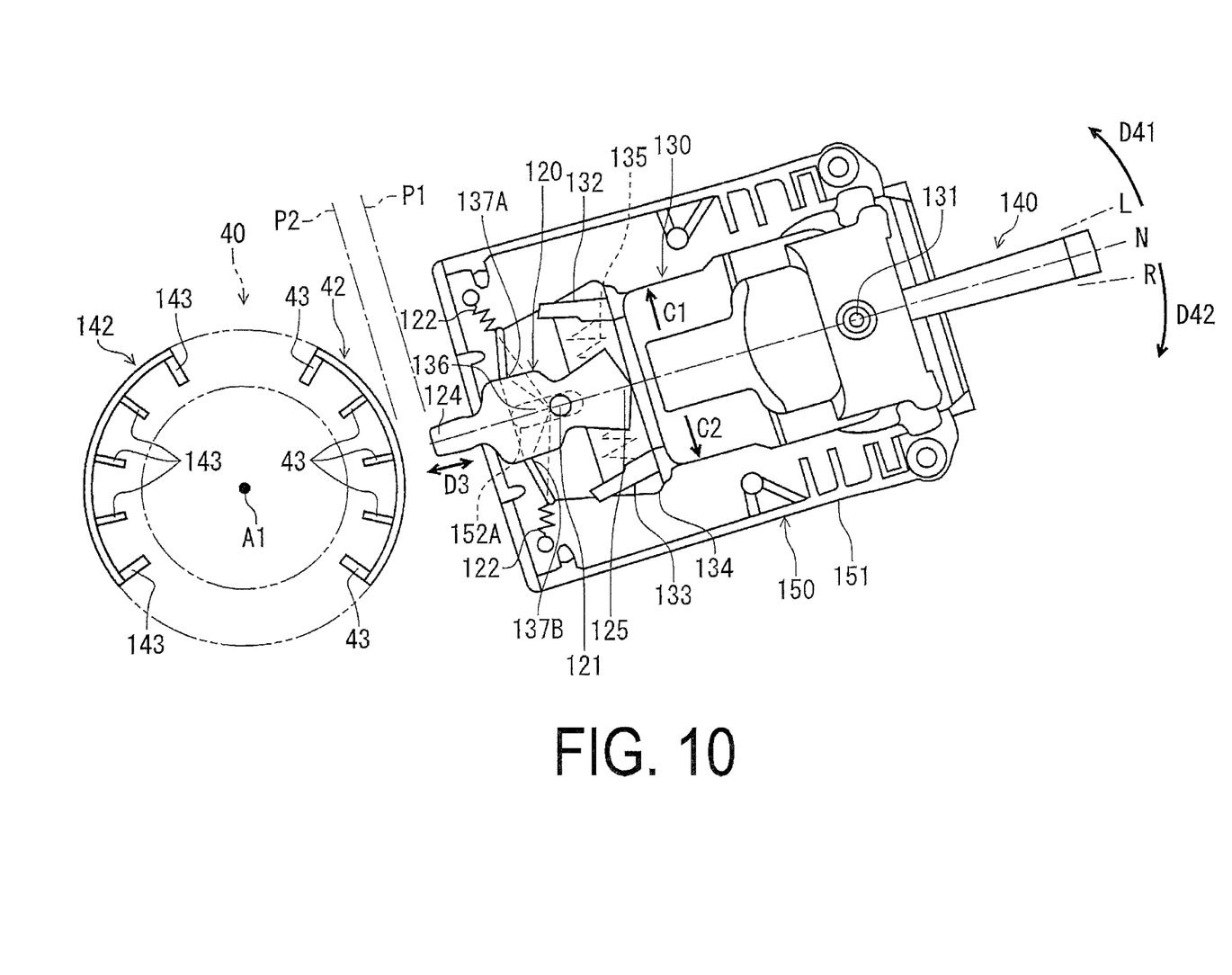
FIG. 10 is a schematic view of the cancel cam and a turn signal switch (neutral position).

The cam wall 42 is configured to return a turn signal switch 150 (see FIG. 10) from an operating position L or R (see FIG. 10) to a neutral position N (see FIG. 10). The cam wall 42 extends from the outer peripheral portion 44 in the axial direction D1 and extends along the outer peripheral portion 44 in a circumferential direction D2. The cam wall 42 includes a first circumferential end 42A and a second circumferential end 42B. The cam wall 42 extends from the first circumferential end 42A to the second circumferential end 42B in the circumferential direction D2.

The at least one reinforcing rib 43 extends from the cam wall 42 toward the inner peripheral portion 45 and couples the cam wall 42 to the annular member 41. The at least one reinforcing rib 43 extends from the cam wall 42 toward the inner peripheral portion 45 and couples the cam wall 42 to the first surface 46.

The at least one reinforcing rib 43 includes a plurality of reinforcing ribs 43. The at least one reinforcing rib 43 includes a first reinforcing rib 43A which is coupled to the first circumferential end 42A and a second reinforcing rib 43B which is coupled to the second circumferential end 42B. The at least one reinforcing rib 43 includes at least one intermediate reinforcing rib 43C. The at least one intermediate reinforcing rib 43C includes a plurality of intermediate reinforcing ribs 43C.

The at least one reinforcing rib 43 includes an inclined surface 43D which extends from the cam wall 42 toward the first surface 46 and is inclined with respect to the rotation axis A1. The first reinforcing rib 43A includes an inclined surface 43D which extends from the cam wall 42 toward the first surface 46 and is inclined with respect to the rotation axis A1. The second reinforcing rib 43B includes an inclined surface 43D which extends from the cam wall 42 toward the first surface 46 and is inclined with respect to the rotation axis A1. The intermediate reinforcing rib 43C includes an inclined surface 43D which extends from the cam wall 42 toward the first surface 46 and is inclined with respect to the rotation axis A1.

Figure 3:
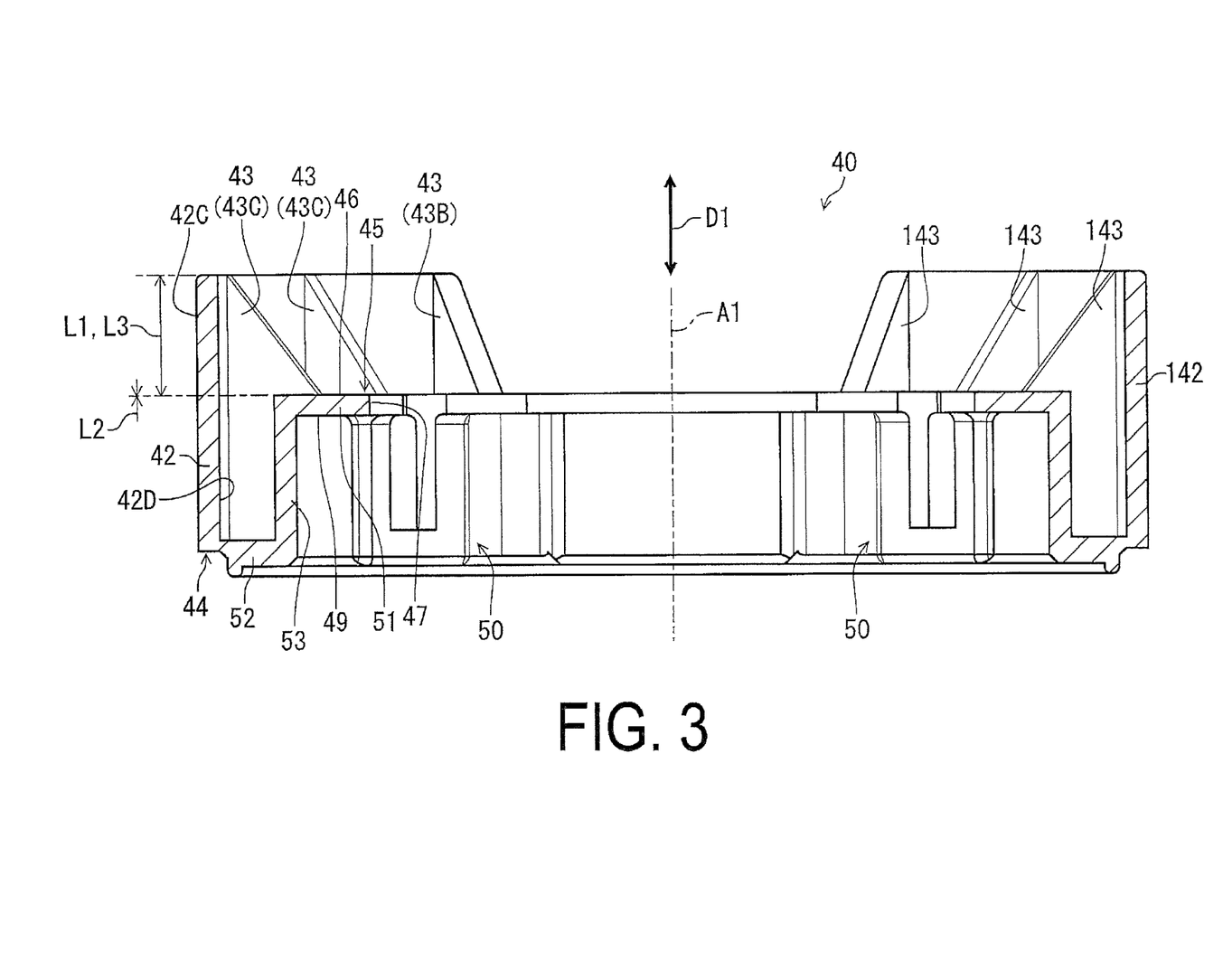
FIG. 3 is a cross-sectional view of the cancel cam taken along a line in FIG. 8.

As illustrated in FIG. 3, the cam wall 42 has a first axial length L1 defined from the first surface 46 in the axial direction D1. The inner peripheral portion 45 has a second axial length L2 defined from the first surface 46 in the axial direction D1. The at least one reinforcing rib 43 has a third axial length L3 defined from the first surface 46 in the axial direction D1. The second axial length L2 is shorter than the first axial length L1. The second axial length L2 is shorter than the third axial length L3. The third axial length L3 is equal to or shorter than the first axial length L1. The third axial length L3 is equal to the first axial length L1. However, the third axial length L3 may be shorter than the first axial length L1.

Figure 4:
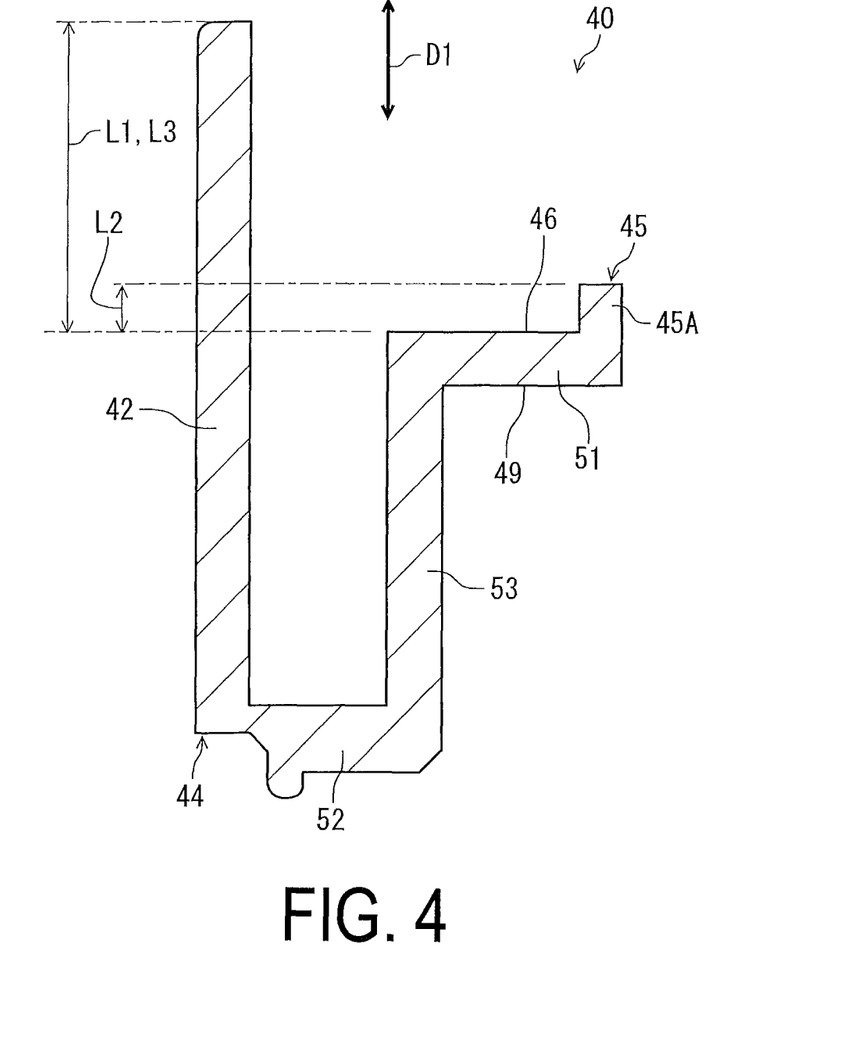
FIG. 4 is a cross-sectional view of a cancel cam according to a variation.

In the present embodiment, the second axial length L2 is 50% or less of the first axial length L1. The second axial length L2 is 25% or less of the first axial length L1. The second axial length L2 is 50% or less of the third axial length L3. The third axial length L3 is 25% or less of the first axial length L1. The annular member 41 does not have a portion protruding in the axial direction D1 from the first surface 46 in the inner peripheral portion 45. That is, in the present embodiment, the second axial length L2 may be zero. However, as illustrated in FIG. 4, the second axial length L2 may be greater than zero. In this case, the inner peripheral portion 45 includes a protruding portion 45A which extends from the first surface 46 in the axial direction D1.

Figure 5:
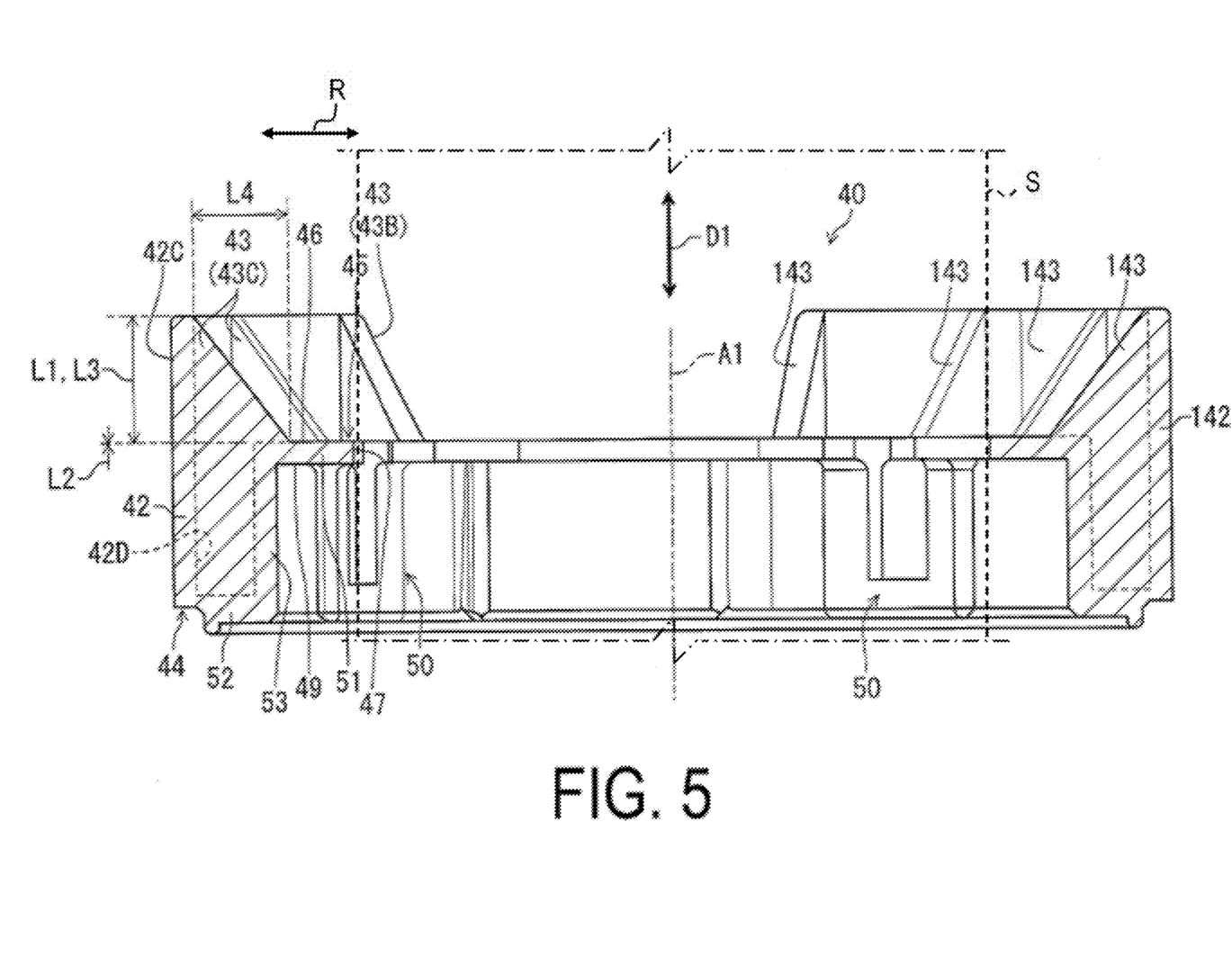
FIG. 5 is a cross-sectional view of the cancel cam taken along a line V-V in FIG. 8.

As illustrated in FIG. 5, the cam wall 42 includes an outer peripheral surface 42C and an inner peripheral surface 42D. The outer peripheral surface 42C is contactable with a turn lever. The inner peripheral surface 42D is provided on the back side of the outer peripheral surface 42C. The reinforcing rib 43 extends from the inner peripheral surface 42D inward in a radial direction R. The reinforcing rib 43 extends from a second annular plate 52 in the axial direction D1. The reinforcing rib 43 couples the cam wall 42, the second annular plate 52, and an intermediate portion 53.

The at least one reinforcing rib 43 has a radial length L4 defined from the cam wall 42 in the radial direction. The radial length L4 of the reinforcing rib 43 is defined from the inner peripheral surface 42D of the cam wall 42 on the inner side in the radial direction. In the present embodiment, the radial length L4 is shorter than the third axial length L3. However, the radial length L4 may be equal to or longer than the third axial length L3.

Figure 6:
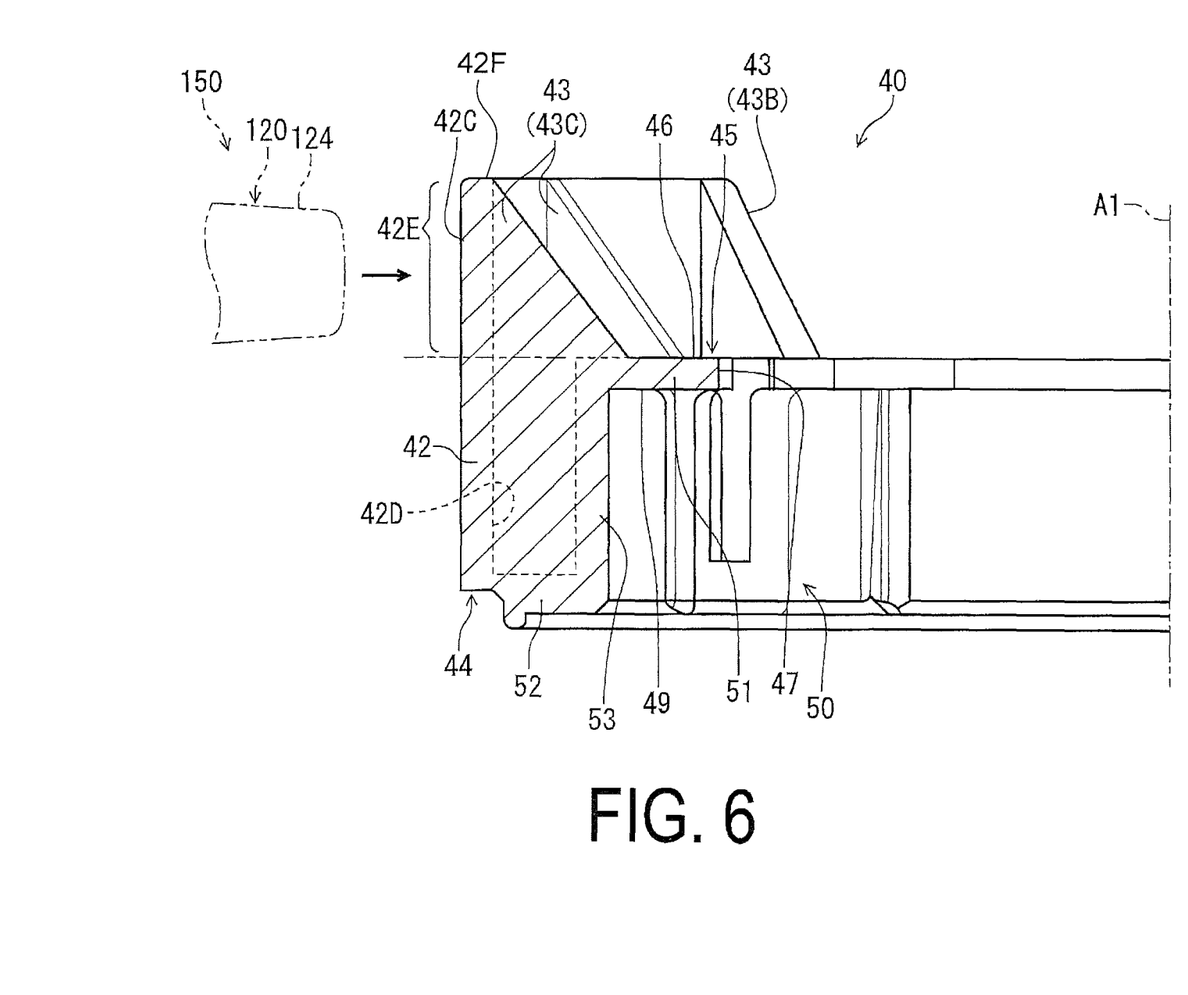
FIG. 6 is a partial cross-sectional view of the cancel cam illustrated in FIG. 8.

As illustrated FIG. 6, the outer peripheral surface 42C of the cam wall 42 includes a contact surface 42E with which a ratchet 120 (see FIG. 10) of the turn signal switch 150 comes in contact. The cam wall 42 includes an axial end portion 42F which is farthest from the outer peripheral portion 44 in the axial direction D1. The contact surface 42E is provided between the first surface 46 and the axial end portion 42F in the axial direction D1.

Figure 7:
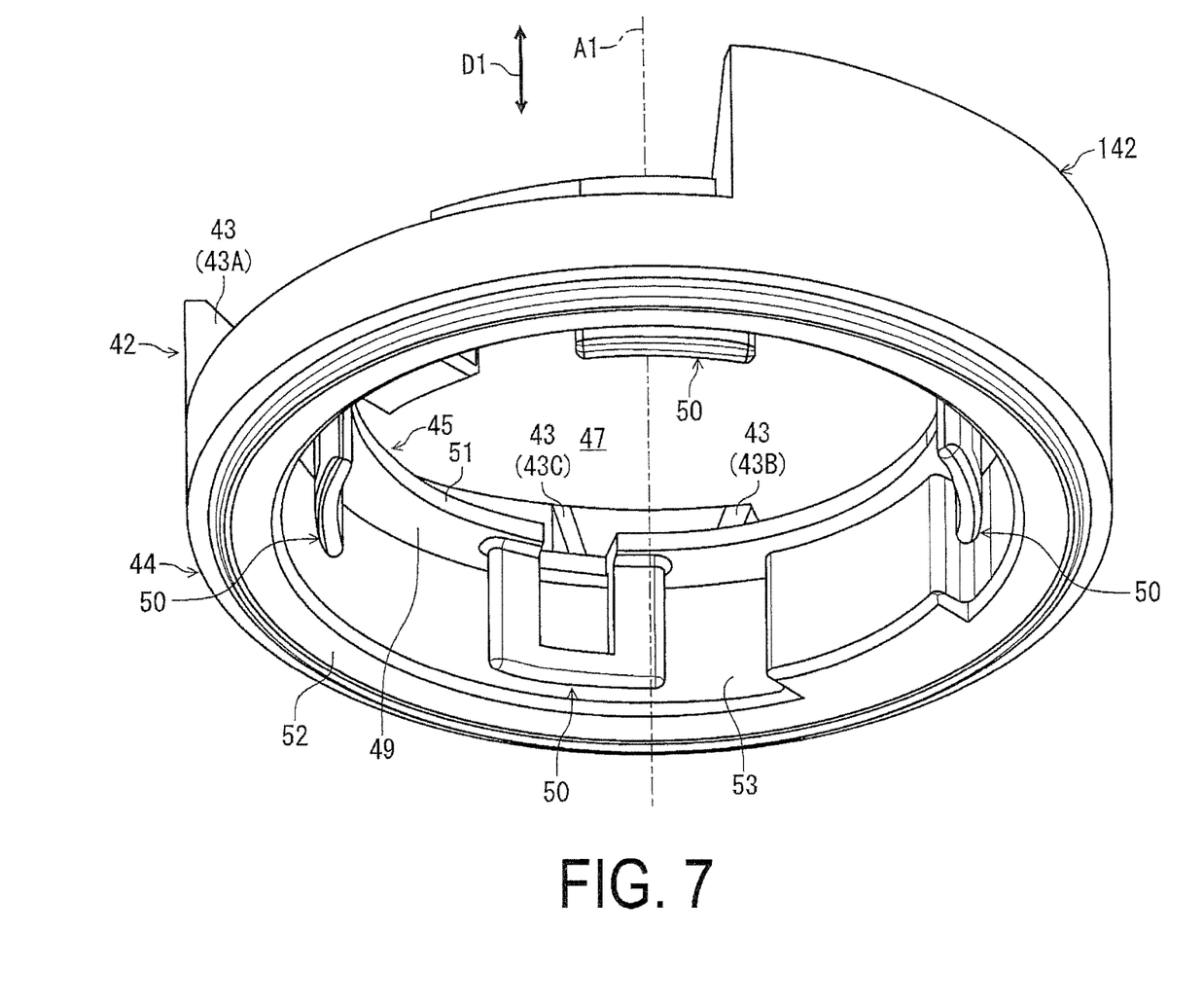
FIG. 7 is a perspective view of the cancel cam.

As illustrated in FIG. 3, the annular member 41 includes a second surface 49 which faces in the axial direction D1. The second surface 49 is provided on the back side of the first surface 46. As illustrated in FIG. 7, the cancel cam 40 includes a plurality of coupling portions 50. The plurality of coupling portions 50 extend from the second surface 49 in the axial direction D1. The coupling portion 50 extends from the inner peripheral portion 45 in the axial direction D1. The coupling portion 50 is configured to be coupled to the rotator 10.

Figure 8:
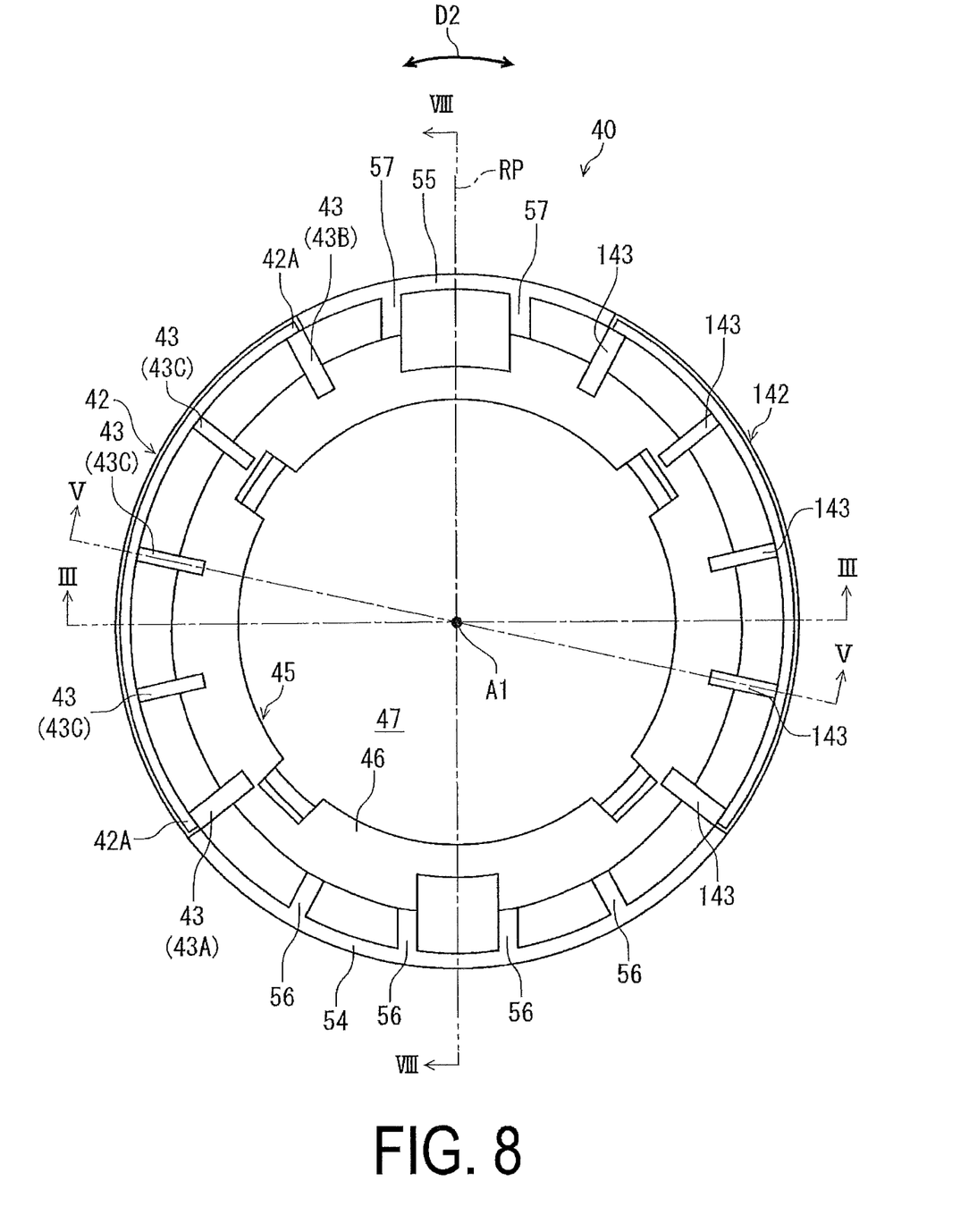
FIG. 8 is a plan view of the cancel cam.

As illustrated in FIG. 8, in the present embodiment, the cancel cam 40 has a symmetrical shape with respect to a reference plane RP. The reference plane RP is a virtual plane including the rotation axis A1. The cancel cam 40 includes a cam wall 142 and at least one reinforcing rib 143. The cam wall 142 has a symmetrical shape with respect to the reference plane RP and has substantially the same structure as the cam wall 42. The at least one reinforcing rib 143 includes a plurality of reinforcing ribs 143. The plurality of reinforcing ribs 143 are symmetrical in shape to the plurality of reinforcing ribs 43 with respect to the reference plane RP and have substantially the same structure as the plurality of reinforcing ribs 43. However, the cancel cam 40 may have an asymmetrical shape with respect to the reference plane RP.

The intermediate reinforcing rib 43C is disposed between the first reinforcing rib 43A and the second reinforcing rib 43B. The thickness of at least one of the first reinforcing rib 43A and the second reinforcing rib 43B is greater than the thickness of the intermediate reinforcing rib 43C. In the present embodiment, the thickness of the first reinforcing rib 43A and the thickness of the second reinforcing rib 43B are greater than the thickness of the intermediate reinforcing ribs 43C. However, the thickness of at least one of the first reinforcing rib 43A and the second reinforcing rib 43B may be equal to the thickness of the intermediate reinforcing rib 43C or may be smaller than the thickness of the intermediate reinforcing rib 43C.

As illustrated in FIG. 3, the annular member 41 includes a first annular plate 51, the second annular plate 52, and the intermediate portion 53. The first annular plate 51 includes the inner peripheral portion 45, the first surface 46, and the second surface 49. The second annular plate 52 includes the outer peripheral portion 44. The coupling portion 50 extends from the first annular plate 51 in the axial direction D1. The second annular plate 52 is disposed at a position offset from the first annular plate 51 in the axial direction D1. The outer diameter of the second annular plate 52 is greater than the outer diameter of the first annular plate 51. The intermediate portion 53 extends from the first annular plate 51 to the second annular plate 52 in the axial direction D1. The intermediate portion 53 extends from the second surface 49 of the first annular plate 51 to the second annular plate 52 in the axial direction D1. The intermediate portion 53 couples the first annular plate 51 to the second annular plate 52. The cam walls 42 and 142 extend from the outer peripheral portion 44 (in the present embodiment, from the outer circumference of the second annular plate 52) beyond the first annular plate 51 in the axial direction D1. The cam walls 42 and 142 are disposed on the outer side in the radial direction of the intermediate portion 53.

As illustrated in FIG. 8, the annular member 41 includes a first outer peripheral wall 54 and a second outer peripheral wall 55. The first outer peripheral wall 54 extends from the cam wall 42 to the cam wall 142 in the circumferential direction D2. The first outer peripheral wall 54 couples the cam wall 42 to the cam wall 142. The second outer peripheral wall 55 extends from the cam wall 42 to the cam wall 142 in the circumferential direction D2. The second outer peripheral wall 55 couples the cam wall 42 to the cam wall 142.

The annular member 41 includes a plurality of first ribs 56 and a plurality of second ribs 57. The first rib 56 couples the first outer peripheral wall 54 to the second annular plate 52 and the intermediate portion 53. The second rib 57 couples the second outer peripheral wall 55 to the second annular plate 52 and the intermediate portion 53.

Figure 9:
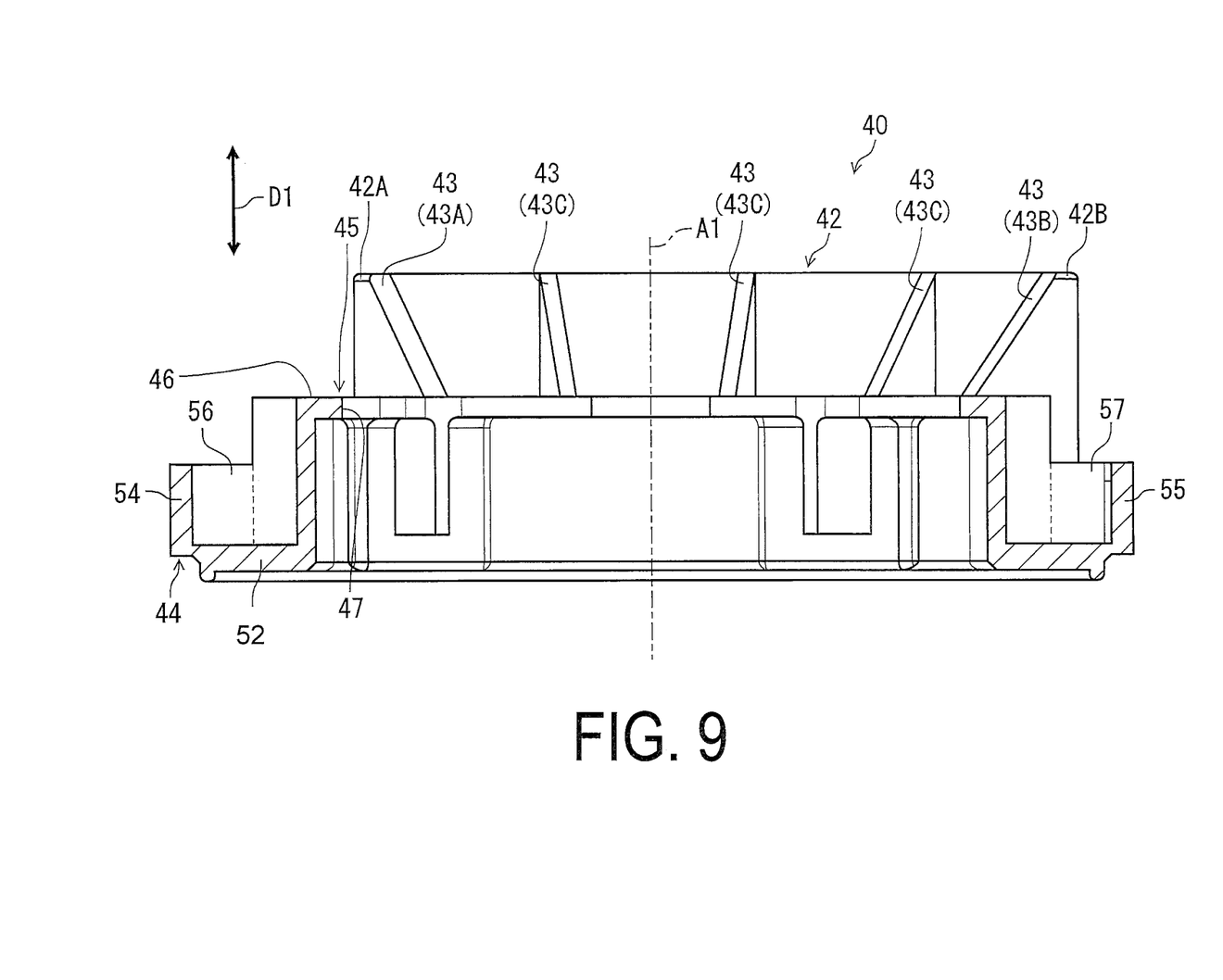
FIG. 9 is a cross-sectional view of the cancel cam taken along a line VIII-VIII in FIG. 8.

As illustrated in FIG. 9, the first outer peripheral wall 54 and the second outer peripheral wall 55 extend from the outer peripheral portion 44 (in the present embodiment, from the outer circumference of the second annular plate 52) in the axial direction D1. The first rib 56 extends from the first outer peripheral wall 54 to the intermediate portion 53. The second rib 57 extends from the second outer peripheral wall 55 to the intermediate portion 53.

As illustrated in FIG. 10, the turn signal switch 150 is disposed on the outer side in the radial direction of the cancel cam 40. The turn signal switch 150 includes the ratchet 120, a ratchet spring 122, a bracket 130, a back spring 135, a turn lever 140, and a case 151. The case 151 is fixed to a vehicle body. The ratchet 120, the ratchet spring 122, the bracket 130, and the back spring 135 are provided in the case 151. The ratchet 120 is coupled to the case 151 so as to be movable in a moving direction D3 with respect to the case 151. The ratchet 120 is provided so as to be contactable with the cam wall 42 of the cancel cam 40. The ratchet spring 122 is coupled to the ratchet 120 and the case 151 so as to bias the ratchet 120 toward the cam wall 42. The bracket 130 is rotatably coupled to the case 151 by a bracket shaft 131. The bracket 130 is rotatable in a first direction D41 and a second direction D42 with respect to the case 151. The turn lever 140 is fixed to the bracket 130 and is rotatable with the bracket 130 with respect to the case 151. The turn lever 140 and the bracket 130 are rotatable from the neutral position N to the operating position L or R with respect to the case 151. The operating position L may also be referred to as a left turn indication position L. The operating position R may also be referred to as a right turn indication position R. When the turn lever 140 is not operated, the back spring 135 holds the bracket 130 and the turn lever 140 in the neutral position N.

The ratchet 120 includes a ratchet shaft 121, a first ratchet end portion 124, and a second ratchet end portion 125. A back plate 134 includes a guide groove 152A. The ratchet shaft 121 is disposed in the guide groove 152A. The ratchet 120 is guided to the moving direction D3 by the guide groove 152A. The ratchet 120 is rotatable around the ratchet shaft 121 with respect to the case 151. The first ratchet end portion 124 is contactable with the cam wall 42 of the cancel cam 40. The ratchet shaft 121 is disposed between the first ratchet end portion 124 and the second ratchet end portion 125.

The bracket 130 includes the back plate 134. The back plate 134 is provided so as to be movable in a first moving direction C1 and a second moving direction C2 with respect to the case 151. The back plate 134 includes a first engagement portion 132, a second engagement portion 133, and a guide portion 136. The second ratchet end portion 125 is disposed between the first engagement portion 132 and the second engagement portion 133. The guide portion 136 is configured to guide the ratchet 120 to the moving direction D3. The guide portion 136 always contacts the ratchet shaft 121 by the biasing force of the ratchet spring 122. Thus, the guide portion 136 is configured to hold the position of the ratchet 120.

For example, when the turn lever 140 and the bracket 130 are disposed in the neutral position N, the ratchet shaft 121 of the ratchet 120 contacts the tip of the guide portion 136. This causes the guide portion 136 to hold the ratchet 120 in a normal position P1. When the ratchet 120 is in the normal position P1, the first ratchet end portion 124 of the ratchet 120 is separated from the cancel cam 40. When the turn lever 140 and the bracket 130 are disposed in the neutral position N, the second ratchet end portion 125 of the ratchet 120 is disposed between the first engagement portion 132 and the second engagement portion 133.

Figure 11:
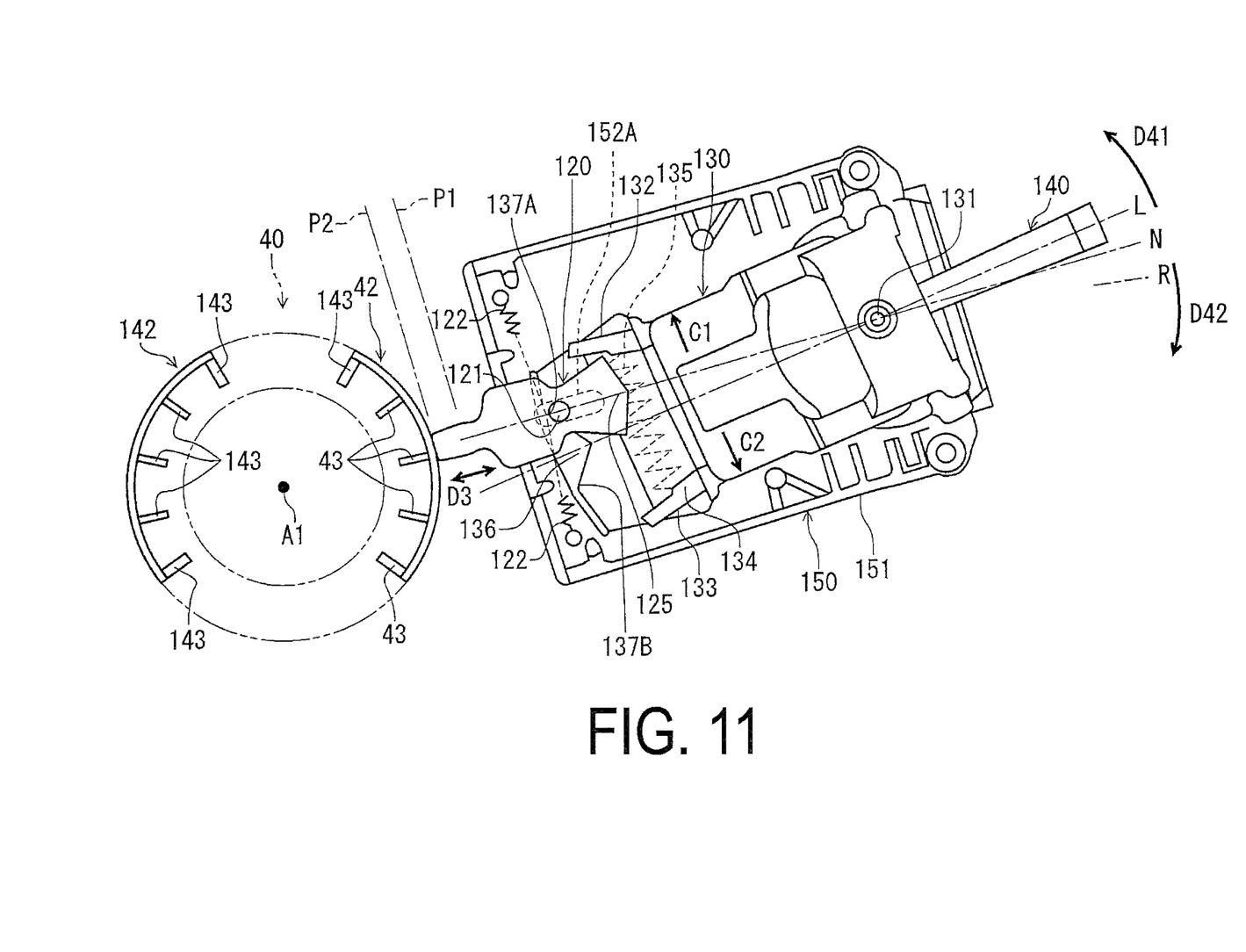
FIG. 11 is a schematic view of the cancel cam and the turn signal switch (operating position).

As illustrated in FIG. 11, when the turn lever 140 is operated from the neutral position N to the first direction D41 or the second direction D42, the ratchet shaft 121 moves to a first guide recess portion 137A or a second guide recess portion 137B of the guide portion 136, and the turn lever 140 is held in the operating position L or R. At this time, the ratchet 120 moves to a contact position P2 where the ratchet 120 is contactable with the cam wall 42 of the cancel cam 40, and the first ratchet end portion 124 collides with the cam wall 42 by the biasing force of the ratchet spring 122. This collision causes abnormal noise.

The cancel cam 40 according to the present embodiment includes the annular member 41, the cam wall 42, and the at least one reinforcing rib 43. The annular member 41 is rotatable integrally with a steering shaft around the rotation axis A1, and includes the outer peripheral portion 44, the inner peripheral portion 45, and the first surface 46 which faces in the axial direction D1 parallel to the rotation axis A1. The cam wall 42 is configured to return the turn signal switch 150 from the operating position L or R to the neutral position N, and extends from the outer peripheral portion 44 in the axial direction D1 and extends along the outer peripheral portion 44 in the circumferential direction D2. The at least one reinforcing rib 43 extends from the cam wall 42 toward the inner peripheral portion 45 and couples the cam wall 42 to the annular member 41. The cam wall 42 has the first axial length L1 defined from the first surface 46 in the axial direction D1. The inner peripheral portion 45 has the second axial length L2 defined from the first surface 46 in the axial direction D1. The second axial length L2 is shorter than the first axial length L1.

In the cancel cam structure 10 described in FIGS. 2 to 6 of JP5138022, because the height of the inner wall 13b is equal to the height of the outer peripheral cam wall 13a, abnormal noise generated by the contact between the ratchet 20 and the outer peripheral cam wall 13a can reverberate in a hollow between the outer peripheral cam wall 13a and the inner wall 13b and may become abnormal noise offensive to a driver.

In contrast, in the cancel cam 40 according to the present application, because the second axial length L2 is shorter than the first axial length L1, it is possible to suppress the reverberation of the abnormal noise generated by the contact between the turn signal switch 150 and the cam wall 42 on an inner side in the radial direction of the cam wall 42. On the other hand, the coupling strength between the annular member 41 and the cam wall 42 can be ensured by the at least one reinforcing rib 43. This makes it possible to ensure the mechanical strength of the cancel cam 40 and reduce the abnormal noise generated by the contact between the turn signal switch 150 and the cancel cam 40.

The annular member 41 does not have a portion protruding in the axial direction D1 from the first surface 46 in the inner peripheral portion 45. This makes it possible to reliably suppress the reverberation of the abnormal noise generated by the contact between the turn signal switch 150 and the cam wall 42 on the inner side in the radial direction of the cam wall 42.

The at least one reinforcing rib 43 extends from the cam wall 42 toward the inner peripheral portion 45 and couples the cam wall 42 to the first surface 46. This allows the increase of the coupling strength between the annular member 41 and the cam wall 42.

The at least one reinforcing rib 43 includes the inclined surface 43D which extends from the cam wall 42 toward the first surface 46 and is inclined with respect to the rotation axis A1. This makes it possible to increase the coupling strength between the annular member 41 and the cam wall 42 and suppress the reverberation of the abnormal noise generated by the contact between the turn signal switch 150 and the cam wall 42 on the inner side in the radial direction of the cam wall 42.

The at least one reinforcing rib 43 has the third axial length L3 defined from the first surface 46 in the axial direction D1. The second axial length L2 is shorter than the third axial length L3. This makes it possible to reliably suppress the reverberation of the abnormal noise generated by the contact between the turn signal switch 150 and the cam wall 42 on the inner side in the radial direction of the cam wall 42.

The third axial length L3 is equal to or shorter than the first axial length L1. This makes it possible to suppress the generation of the abnormal noise and reduce the weight of the cancel cam 40.

The at least one reinforcing rib 43 has the radial length L4 defined from the cam wall 42 in the radial direction. The radial length L4 is shorter than the third axial length L3. This makes it possible to suppress the generation of the abnormal noise and reduce the weight of the cancel cam 40.

The at least one reinforcing rib 43 includes a plurality of reinforcing ribs 43. This makes it possible to increase the coupling strength between the annular member 41 and the cam wall 42 and suppress the reverberation of the abnormal noise generated by the contact between the turn signal switch 150 and the cam wall 42 on the inner side in the radial direction of the cam wall 42.

The cam wall 42 includes the first circumferential end 42A and the second circumferential end 42B. The cam wall 42 extends from the first circumferential end 42A to the second circumferential end 42B in the circumferential direction D2. This makes it easier to ensure the mechanical strength of the cam wall 42.

The at least one reinforcing rib 43 includes the first reinforcing rib 43A which is coupled to the first circumferential end 42A and the second reinforcing rib 43B which is coupled to the second circumferential end 42B. This allows the increase of the mechanical strength of the cam wall 42.

The at least one reinforcing rib 43 includes the intermediate reinforcing rib 43C disposed between the first reinforcing rib 43A and the second reinforcing rib 43B. The thickness of at least one of the first reinforcing rib 43A and the second reinforcing rib 43B is greater than the thickness of the intermediate reinforcing rib 43C. Thus, at least one of the first circumferential end 42A and the second circumferential end 42B of the cam wall 42 can be efficiently reinforced by at least one of the first reinforcing rib 43A and the second reinforcing rib 43B, and the intermediate portion of the cam wall 42 can be reinforced by the intermediate reinforcing rib 43C. In other words, the mechanical strength of the cam wall 42 can be efficiently increased by the first reinforcing rib 43A, the second reinforcing rib 43B, and the intermediate reinforcing rib 43C.

A cancel cam according to a first aspect includes an annular member, a cam wall, and at least one reinforcing rib. The annular member is rotatable integrally with a steering shaft about a rotation axis and includes an outer peripheral portion, an inner peripheral portion, and a first surface which faces in an axial direction parallel to the rotation axis. The cam wall is configured to return the turn signal switch from an operating position to a neutral position. The cam wall extends from the outer peripheral portion in an axial direction and extends along the outer peripheral portion in a circumferential direction. The at least one reinforcing rib extends from the cam wall toward the inner peripheral portion and couples the cam wall to the annular member. The cam wall has a first axial length defined from the first surface in the axial direction. The inner peripheral portion has a second axial length defined from the first surface in the axial direction. The second axial length is shorter than the first axial length.

With the cancel cam according to the first aspect, the second axial length is shorter than the first axial length, and thus it is possible to suppress the reverberation of abnormal noise generated by the contact between the turn signal switch and the cam wall on an inner side in a radial direction of the cam wall. On the other hand, the coupling strength between the annular member and the cam wall can be ensured by the at least one reinforcing rib. This makes it possible to ensure the mechanical strength of the cancel cam and reduce the abnormal noise generated by the contact between the turn signal switch and the cancel cam.

The cancel cam according to a second aspect is the cancel cam according to the first aspect, wherein the annular member does not have a portion protruding in the axial direction from the first surface in the inner peripheral portion.

With the cancel cam according to aspect 2, it is possible to reliably suppress the reverberation of the abnormal noise generated by the contact between the turn signal switch and the cancel cam on the inner side in the radial direction of the cam wall.

The cancel cam according to a third aspect is the cancel cam according to the first or second aspect, wherein the at least one reinforcing rib extends from the cam wall toward the inner peripheral portion and couples the cam wall to the first surface.

With the cancel cam according to the third aspect, the coupling strength between the annular member and the cam wall can be increased.

The cancel cam according to a fourth aspect is the cancel cam according to any one of the first to third aspects, wherein the at least one reinforcing rib includes an inclined surface which extends from the cam wall toward the first surface and is inclined with respect to the rotation axis.

With the cancel cam according to the fourth aspect, it is possible to increase the coupling strength between the annular member and the cam wall and suppress the reverberation of the abnormal noise generated by the contact between the turn signal switch and the cam wall on the inner side in the radial direction of the cam wall.

The cancel cam according to a fifth aspect is the cancel cam according to any one of the first to fourth aspects, wherein the at least one reinforcing rib has a third axial length defined from the first surface in the axial direction. The second axial length is shorter than the third axial length.

With the cancel cam according to the fifth aspect, it is possible to reliably suppress the reverberation of the abnormal noise generated by the contact between the turn signal switch and the cancel cam on the inner side in the radial direction of the cam wall.

The cancel cam according to a sixth aspect is the cancel cam according to the fifth aspect, wherein the third axial length is equal to or shorter than the first axial length.

With the cancel cam according to the sixth aspect, it is possible to suppress the generation of the abnormal noise and reduce the weight of the cancel cam.

The cancel cam according to a seventh aspect is the cancel cam according to the fifth or sixth aspect, wherein the at least one reinforcing rib has a radial length defined from the cam wall in the radial direction. The radial length is shorter than the third axial length.

With the cancel cam according to the seventh aspect, it is possible to suppress the generation of the abnormal noise and reduce the weight of the cancel cam.

The cancel cam according to an eighth aspect is the cancel cam according to any one of the first to seventh aspects, wherein the at least one reinforcing rib includes a plurality of reinforcing ribs.

With the cancel cam according to the eighth aspect, it is possible to reliably increase the coupling strength between the annular member and the cam wall and suppress the reverberation of the abnormal noise generated by the contact between the turn signal switch and the cam wall on the inner side in the radial direction of the cam wall.

The cancel cam according to a ninth aspect is the cancel cam according to any one of the first to eighth aspects, wherein the cam wall includes a first circumferential end and a second circumferential end. The cam wall extends from the first circumferential end to the second circumferential end in the circumferential direction.

With the cancel cam according to the ninth aspect, the mechanical strength of the cam wall can be easily ensured.

The cancel cam according to a tenth aspect is the cancel cam according to any one of the first to ninth aspects, where the at least one reinforcing rib includes a first reinforcing rib which is coupled to the first circumferential end and a second reinforcing rib which is coupled to the second circumferential end.

With the cancel cam according to the tenth aspect, the mechanical strength of the cam wall can be increased.

The cancel cam according to an eleventh aspect is the cancel cam according to the tenth aspect, wherein the at least one reinforcing rib includes an intermediate reinforcing rib which is disposed between the first reinforcing rib and the second reinforcing rib. The thickness of at least one of the first reinforcing rib and the second reinforcing rib is greater than the thickness of the intermediate reinforcing rib.

With the cancel cam according to the eleventh aspect, at least one of the first circumferential end and the second circumferential end of the cam wall can be efficiently reinforced by at least one of the first reinforcing rib and the second reinforcing rib, and the intermediate portion of the cam wall can be reinforced by the intermediate reinforcing rib. In other words, the mechanical strength of the cam wall can be efficiently increased by the first reinforcing rib, the second reinforcing rib, and the intermediate reinforcing rib.

Note that, in the present application, "comprise" and its derivatives are open ended terms intended to describe the existence of a constituent element and do not exclude the existence of other constituent elements not described. This also applies to "have", "include" and their derivatives.

In the present application, a number such as "first" or "second" is merely a term for identifying a configuration, and does not have any other meaning (e.g., a particular order, or the like). For example, the presence of a "first element" does not imply that a "second element" exists, and the presence of a "second element" does not imply that a "first element" exists.

Expressions such as "parallel", "orthogonal", and "identical" in the present disclosure should not be interpreted strictly and include respectively the meanings of "substantially parallel", "substantially orthogonal", and "substantially identical". Further, representations of other arrangements are not to be strictly interpreted.

Furthermore, the expression "at least one of A and B" in the present disclosure encompasses, for example, all of (1) only A, (2) only B, and (3) both A and B. The expression "at least one of A, B, and C" encompasses, for example, all of (1) only A, (2) only B, (3) only C, (4) A and B, (5) B and C, (6) A and C, and (7) all of A, B, and C. In the present disclosure, the expression "at least one of A and B" is not interpreted as "at least one of A and at least one of B."

Various alterations and modifications of the disclosure are apparent from the foregoing disclosure. Accordingly, the disclosure may be implemented in a manner different from the specific disclosure of the present application without departing from the spirit of the disclosure.

What is claimed is:

1. A cancel cam comprising:
   an annular member comprising an outer peripheral portion, an inner peripheral portion, and a first surface, the annular member being rotatable integrally with a steering shaft about a rotation axis, the first surface facing in an axial direction parallel to the rotation axis;
   a cam wall configured to return a turn signal switch from an operating position to a neutral position, the cam wall extending from the outer peripheral portion in the axial direction and extending along the outer peripheral portion in a circumferential direction; and
   at least one reinforcing rib extending from the cam wall to the inner peripheral portion and coupling the cam wall to the annular member,
   the cam wall having a first axial length defined from the first surface in the axial direction to an axial end portion of the cam wall,
   the inner peripheral portion having a second axial length defined from the first surface in the axial direction to an axial end portion of the inner peripheral portion,
   wherein the annular member includes a first annular plate, a second annular plate, and an intermediate portion,
   the first annular plate includes the inner peripheral portion, the first surface, and a second surface,
   the second annular plate includes the outer peripheral portion,
   a coupling portion extends from the first annular plate in the axial direction,
   the second annular plate is disposed at a position offset from the first annular plate in the axial direction,
   an outer diameter of the second annular plate is greater than an outer diameter of the first annular plate,
   the intermediate portion extends from the second surface of the first annular plate to the second annular plate in the axial direction,
   the intermediate portion couples the first annular plate to the second annular plate,
   the cam wall extends from the outer peripheral portion beyond the first annular plate in the axial direction, and
   the cam wall is disposed on an outer side in a radial direction of the intermediate portion.

2. The cancel cam according to claim 1, wherein
the annular member does not have a portion protruding in the axial direction from the first surface in the inner peripheral portion.

3. The cancel cam according to claim 1, wherein
the at least one reinforcing rib extends from the cam wall toward the inner peripheral portion and couples the cam wall to the first surface.

4. The cancel cam according to claim 1, wherein
the at least one reinforcing rib has a third axial length defined from the first surface in the axial direction to an axial end portion of the reinforcing rib, and
the second axial length is shorter than the third axial length.

5. The cancel cam according to claim 4, wherein
the third axial length is equal to or shorter than the first axial length.

6. The cancel cam according to claim 4, wherein
the at least one reinforcing rib has a radial length defined in the radial direction from the cam wall to a radial end portion of the at least one reinforcing rib, and
the radial length is shorter than the third axial length.

7. The cancel cam according to claim 1, wherein
the at least one reinforcing rib comprises a plurality of reinforcing ribs.

8. The cancel cam according to claim 1, wherein
the cam wall comprises a first circumferential end and a second circumferential end, and
the cam wall extends from the first circumferential end to the second circumferential end in the circumferential direction.

9. The cancel cam according to claim 8, wherein
the at least one reinforcing rib comprises a first reinforcing rib and a second reinforcing rib, the first reinforcing rib being coupled to the first circumferential end, the second reinforcing rib being coupled to the second circumferential end.

10. A cancel cam comprising:
an annular member comprising an outer peripheral portion, an inner peripheral portion, and a first surface, the annular member being rotatable integrally with a steering shaft about a rotation axis, the first surface facing in an axial direction parallel to the rotation axis;
a cam wall configured to return a turn signal switch from an operating position to a neutral position, the cam wall extending from the outer peripheral portion in the axial direction and extending along the outer peripheral portion in a circumferential direction; and
at least one reinforcing rib extending from the cam wall to the inner peripheral portion and coupling the cam wall to the annular member,
the cam wall having a first axial length defined from the first surface in the axial direction to an axial end portion of the cam wall,
the inner peripheral portion having a second axial length defined from the first surface in the axial direction to an axial end portion of the inner peripheral portion, and
the second axial length being shorter than the first axial length, wherein
the at least one reinforcing rib comprises an inclined surface, the inclined surface extending from the cam wall toward the first surface and being inclined with respect to the rotation axis.

11. A cancel cam comprising:
an annular member comprising an outer peripheral portion, an inner peripheral portion, and a first surface, the annular member being rotatable integrally with a steering shaft about a rotation axis, the first surface facing in an axial direction parallel to the rotation axis;
a cam wall configured to return a turn signal switch from an operating position to a neutral position, the cam wall extending from the outer peripheral portion in the axial direction and extending along the outer peripheral portion in a circumferential direction; and
at least one reinforcing rib extending from the cam wall to the inner peripheral portion and coupling the cam wall to the annular member,
the cam wall having a first axial length defined from the first surface in the axial direction to an axial end portion of the cam wall,
the inner peripheral portion having a second axial length defined from the first surface in the axial direction to an axial end portion of the inner peripheral portion, and
the second axial length being shorter than the first axial length, wherein
the cam wall comprises a first circumferential end and a second circumferential end,
the cam wall extends from the first circumferential end to the second circumferential end in the circumferential direction,
the at least one reinforcing rib comprises a first reinforcing rib and a second reinforcing rib, the first reinforcing rib being coupled to the first circumferential end, the second reinforcing rib being coupled to the second circumferential end,
the at least one reinforcing rib comprises an intermediate reinforcing rib disposed between the first reinforcing rib and the second reinforcing rib, and
a thickness of at least one of the first reinforcing rib and the second reinforcing rib is greater than a thickness of the intermediate reinforcing rib.

* * * * *